US010674435B2

(12) United States Patent
Katabi et al.

(10) Patent No.: US 10,674,435 B2
(45) Date of Patent: Jun. 2, 2020

(54) HASH BASED BEAM ALIGNMENT

(71) Applicant: Massachusetts Institute of Technology, Cambridge, MA (US)

(72) Inventors: Dina Katabi, Cambridge, MA (US); Omid Salehi-Abari, Cambridge, MA (US); Haitham Zuhair Al-Hassanieh, Champaign, IL (US); Michael Rodriguez, Miami, FL (US); Piotr Indyk, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 422 days.

(21) Appl. No.: 15/458,201

(22) Filed: Mar. 14, 2017

(65) Prior Publication Data
US 2019/0124585 A1 Apr. 25, 2019

Related U.S. Application Data

(60) Provisional application No. 62/307,777, filed on Mar. 14, 2016.

(51) Int. Cl.
| | |
|---|---|
| *H04B 7/0408* | (2017.01) |
| *H04W 48/08* | (2009.01) |
| *H04B 17/30* | (2015.01) |
| *H04B 7/06* | (2006.01) |
| *G01S 5/02* | (2010.01) |
| *G01S 3/14* | (2006.01) |
| *H04B 7/08* | (2006.01) |
| *H04W 84/12* | (2009.01) |

(52) U.S. Cl.
CPC ............... *H04W 48/08* (2013.01); *G01S 3/14* (2013.01); *G01S 5/02* (2013.01); *H04B 7/0617* (2013.01); *H04B 7/086* (2013.01); *H04B 17/30* (2015.01); *H04W 84/12* (2013.01)

(58) Field of Classification Search
CPC .. H04B 7/0617; H04B 7/0695; H04B 7/0452; H04B 7/088; H04B 7/0408; H04B 17/318; H04B 7/043; H04L 9/0643
USPC .................................................. 455/25, 63.4
See application file for complete search history.

(56) References Cited

U.S. PATENT DOCUMENTS

| | | | |
|---|---|---|---|
| 9,413,474 B2 | 8/2016 | Chai et al. | |
| 10,080,146 B2 * | 9/2018 | Sundstrom et al. | .. H04W 16/28 |
| 2009/0232240 A1 * | 9/2009 | Lakkis | ................. H04B 7/0491 |
| | | | 375/260 |

(Continued)

OTHER PUBLICATIONS

Anderson, Christopher R., and Theodore S. Rappaport. "In-building wideband partition loss measurements at 2.5 and 60 GHz." IEEE transactions on wireless communications 3, No. 3 (2004): 922-928.

(Continued)

*Primary Examiner* — Tu X Nguyen
(74) *Attorney, Agent, or Firm* — Occhiuti & Rohlicek LLP

(57) ABSTRACT

An approach to acquisition of a propagation direction using a phased antenna array avoids a need to scan space. Given all possible directions for setting the antenna beam, the approach provably finds the optimal direction in logarithmic number of measurements. Further, the approach can be applied within the existing 802.11ad standard for mmWave LAN, and can support both clients and access points.

25 Claims, 8 Drawing Sheets

(56) References Cited

U.S. PATENT DOCUMENTS

2010/0103045 A1* 4/2010 Liu .................. H04B 7/0617
 342/372
2015/0293647 A1 10/2015 Katabi et al.

OTHER PUBLICATIONS

Hassanieh, Haitham, Piotr Indyk, Dina Katabi, and Eric Price. "Nearly optimal sparse fourier transform." In Proceedings the of forty-fourth annual ACM symposium on Theory of computing, pp. 563-578. ACM, 2012.

Rangan, Sundeep, Theodore S. Rappaport, and Elza Erkip. "Millimeter-wave cellular wireless networks: Potentials and challenges." Proceedings of the IEEE 102, No. 3 (2014): 366-385.

Sur, Sanjib, Vignesh Venkateswaran, Xinyu Zhang, and Parmesh Ramanathan. "60 ghz indoor networking through flexible beams: A link-level profiling." In ACM Sigmetrics Performance Evaluation Review, vol. 43, No. 1, pp. 71-84. ACM, 2015.

Sur, Sanjib, Xinyu Zhang, Parmesh Ramanathan, and Ranveer Chandra. "BeamSpy: Enabling Robust 60 GHz Links Under Blockage." In NSDI, pp. 193-206. 2016.

Tse, David, and Pramod Viswanath. Fundamentals of wireless communication. Cambridge university press, 2005.

Zhou, Liang, and Yoji Ohashi. "Efficient codebook-based MIMO beamforming for millimeter-wave WLANs." In Personal Indoor and Mobile Radio Communications (PIMRC), 2012 IEEE 23rd International Symposium on, pp. 1885-1889. IEEE, 2012.

IEEE Computer Society LAN/MAN Standards Committee. "IEEE Standard for Information technology Telecommunications and information exchange between systems-Local and metropolitan area networks-Specific requirements Part 11: Wireless LAN Medium-Access Control (MAC) and Physical Layer (PHY) Specifications." Amendment 3: Enhancements for Very High Throughput in the 60 GHz Band, IEEE Std 802.11TM-2012, 628 pages.

\* cited by examiner (a)

(b)

HASH BASED BEAM ALIGNMENT

CROSS-REFERENCE TO RELATED APPLICATIONS

This application claims the benefit of U.S. Provisional Application No. 62/307,777, titled "mmWave Communication," filed Mar. 14, 2016, which is incorporated herein by reference.

FEDERAL SPONSORSHIP

This invention was made with Government support under Contract No. FA8721-05-C-0002 awarded by the U.S. Air Force. The Government has certain rights in the invention.

BACKGROUND

This invention relates to hash-based beam alignment in a phased antenna array, and in particular relates to beam alignment without requiring exhaustive scanning of beam directions.

There is much interest in integrating millimeter wave radios (mmWave) into wireless LANs and 5G cellular networks to benefit from their multiple GHz of available spectrum. Yet unlike existing technologies, e.g., WiFi, mmWave radios require highly directional antennas. Since the antennas have pencil-beams, the transmitter and receiver need to align their antenna beams before they can communicate. Existing solutions scan the entire space to find the best alignment. Such a process has been shown to introduce up to seconds of delay, and is unsuitable for wireless networks where an access point has to quickly switch between users and accommodate mobile clients.

The IEEE 802.11ad includes a beam searching mechanism, however, is not defined in detail in the standard documentation, and it has been left open to the manufacturer. This has resulted in several variations of the 802.11ad beam searching mechanism presented in different documents. However, at a high level, it works in three stages in order to find the best beam alignment between an access point (AP) and a client [3, 8].

The first stage is called Sector Level Sweep (SLS). In this stage, the AP transmits in all possible directions, and the client sets its receiver beam pattern to a quasi-omnidirectional beam. The process is then repeated with the AP setting its receiver antenna to quasi-omnidirectional and the client sweeping through all transmit directions. At the end of this stage, the AP and client each pick the $\gamma$ directions that deliver the largest power. The second stage is called Multiple sector ID Detection (MID). This stage repeats the process above but with the transmit beam set to quasi-omni-directional and the scan being performed with the receive beam. This stage compensates for imperfections in the quasi omnidirectional beams. The third stage is called Beam Combining (BC). In this stage, each of the $\gamma$ best directions at the AP are tried with each of the $\gamma$ directions at the client. Hence, $\gamma^2$ combinations are tested and the combination of transmit and receive beam directions that deliver the maximum power is then selected and used for beamforming during the data transmission.

REFERENCES

[1] Christopher R. Anderson and Theodore S. Rappaport. In-Building Wideband Partition Loss Measurements at 2.5 and 60 GHz. *IEEE Transactions on Wireless Communications,* 3(3), May 2004.

[2] Haitham Hassanieh, Piotr Indyk, Dina Katabi, and Eric Price. Nearly optimal sparse fourier transform. In *STOC,* 2012.

[3] IEEE Standards Association. IEEE Standards 802.11ad-2012: Enhancements for Very High Throughput in the 60 GHz Band, 2012.

[4] Sundeep Rangan, Theodore S Rappaport, and Elza Erkip. Millimeter-wave cellular wireless networks: Potentials and challenges. *Proceedings of the IEEE,* 2014.

[5] Sanjib Sur, Vignesh Venkateswaran, Xinyu Zhang, and Parameswaran Ramanathan. 60 GHz Indoor Networking through Flexible Beams: A Link-Level Profiling. In *SIGMETRICS,* 2015.

[6] Sanjib Sur, Xinyu Zhang, Parameswaran Ramanathan, and Ranveer Chandra. BeamSpy: Enabling Robust 60 GHz Links Under Blockage. In *NSDI,* 2016.

[7] D. Tse and P. Vishwanath. *Fundamentals of Wireless Communications.* Cambridge University Press, 2005.

[8] Liang Zhou and Yoji Ohashi. Efficient Codebook-Based MIMO Beamforming for Millimeter-Wave WLANs. In *PIMRC,* 2012.

SUMMARY

In one aspect, in general, a new protocol (referred to herein as "Rapid-Link") can find the best mmWave beam alignment without scanning the space. Given all possible directions for setting the antenna beam, Rapid-Link provably finds the optimal direction in logarithmic number of measurements. Further, Rapid-Link works within the existing 802.11ad standard for mmWave LAN, and can support both clients and access points. An implementation of Rapid-Link in a mmWave radio shows that beam alignment delay can be reduced by orders of magnitude. In particular, for highly directional mmWave devices operating under 802.11ad, the delay drops from over a second to 2.5 ms.

In another aspect, in general, a method is used to determine a propagation direction of a signal within a range of directions at a transceiver coupled to a plurality of antenna elements. An iterative procedure performed. At each iteration of a plurality of iterations, the signal is passed (e.g., received or transmitted) via the plurality of antenna elements and processed according a set of antenna patterns for the iteration to yield a plurality of plurality of response values. Each response value of the plurality of response values at an iteration represents a strength of response (e.g., an average magnitude or energy) to the signal according to a different pattern of the set of antenna patterns for the iteration. Each plurality of response values for an iteration has a greatest value corresponding to one of the patterns of the set of antenna patterns for that iteration. Each iteration uses a different set of antenna patterns. Each set of antenna patterns includes a pattern with multiple directional lobes. For each set of antenna patterns, a direction of each directional lobe of each pattern is distinct from the directions of all other directional lobes of other patterns in said set. For each set of antenna patterns, for each propagation direction with the range of directions, at least one antenna pattern provides substantial response to signals in said propagation direction. The plurality of response values from each iteration are combined to yield a characterization of the propagation direction of the signal (e.g., a directional profile) by combining antenna patterns of the sets of antenna patterns. This combining includes combining the pattern corresponding to the response value having the greatest value from each iteration to yield a directional profile of the received signal.

Aspects may include combinations of one or more of the following features.

The transceiver comprises a receiver and the signal is received via the plurality of antenna elements, the propagation direction comprising a direction of arrival of the signal.

The signal is transmitted to the receiver using an omnidirectional antenna pattern at the transmitter.

The signal is transmitted to the receiver using successive multi-lobe antenna patterns, which together form a substantially an omni-directional antenna pattern at the transmitter.

The transceiver comprises a transmitter and the signal is transmitted via the plurality of antenna elements, the propagation direction comprising a direction of transmission of the signal.

The response values are determined at a receiver of the signal.

Combining the plurality of response values from each iteration comprises combining only the pattern corresponding to the response value having the greatest value from each iteration.

Combining the plurality of response values from each iteration comprises combining multiple patterns from each iteration weighted according to the plurality of response values for that iteration.

Characterization of the propagation direction of the signal comprises a distribution over directions in the range of directions.

The method further comprises determining the propagation direction from the characterization of the direction of arrival.

The method further comprises determining a restricted range of directions from the characterization of the propagation direction, and determining the propagation direction within the restricted range.

For at least some sets of the antenna patterns, each pattern in said set has a same number of directional lobes.

The sets of antenna patterns are determined prior to the signal being transmitted.

The method further comprises determining the sets of antenna patterns.

Determining the sets of antenna patterns includes randomizing the antenna patterns.

Determining the sets of antenna patterns determining a second set of antenna patterns from a first set of antenna patterns by a random transformation.

Each pattern of the second set of antenna patterns corresponds to a different pattern of the first set of antenna patterns, and the directions of directional lobes of the pattern of the second set are related to the directions of directional lobes of the pattern of the first set by a random permutation of directions.

A plurality of antenna elements form a linear equally spaced array.

The antenna patterns of the sets of antenna patterns are two-dimensional.

The antenna patterns of the sets of antenna patterns are three-dimensional.

Performing the iterative procedure includes performing iterations in sequence using different time portions of the signal.

In another aspect, in general, a transceiver is configured to be coupled to a plurality of antenna elements and configured to perform all the steps of any of the methods set forth above.

In another aspect, in general, a tangible machine-readable medium comprises instructions stored thereon for causing a processor of a transceiver, when coupled to a plurality of antenna elements, to perform all the steps of any of the methods set forth above.

Advantages of aspects include solution to the technical problem of acquisition of a propagation direction in a shorter amount of time than required using conventional approaches, such as scanning. Furthermore, accuracy may be improved over other approached by increasing the signal-to-noise ratio of received signals. The approach may be particularly applicable to millimeter wave radio signals, but is applicable and may provide similar advantages in other propagated signal bands and propagation modes.

Other features and advantages of the invention are apparent from the following description, and from the claims.

DETAILED DESCRIPTION

Overview and Notation

Figure 1:
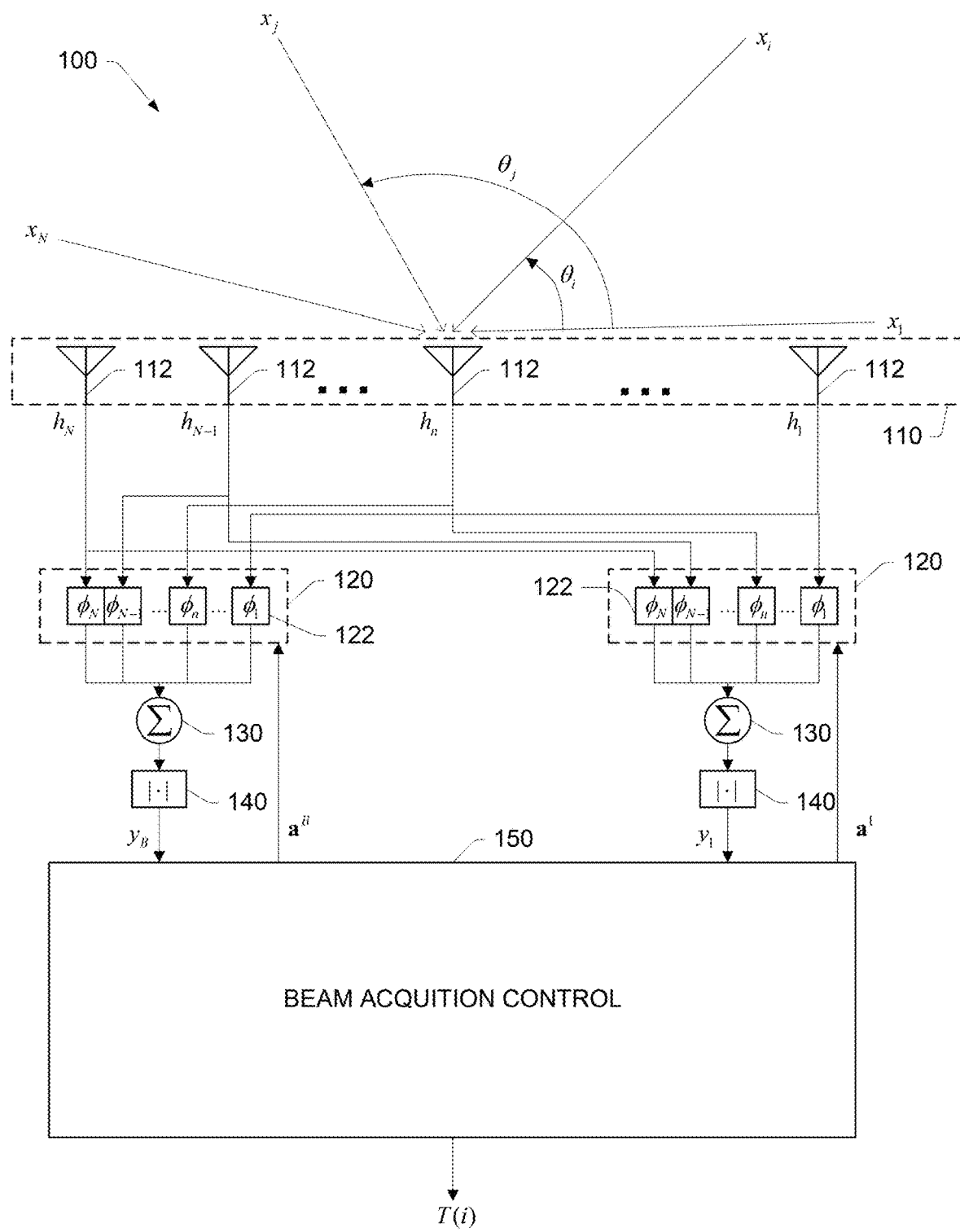
FIG. 1 is a block diagram of a radio communication system implementing beam alignment.

Referring to FIG. 1, an embodiment of a radio communication system 100 implements an approach to acquisition of the direction of arrival of a limited number of radio signals arriving at an antenna array 110, which is composed on N antennas 112. As introduced above, one conventional approach to detecting one or more directions of arrival of radio signals arriving at the antenna array is to scan a directional antenna pattern across all the possible directions of arrival, noting those directions in which the magnitude of the signal is greatest.

In the system shown in FIG. 1, the antenna array is a linear array of N antennas, in this embodiment with a separation between antennas of one-half the radio wavelength, $d=\lambda/2$. However, it should be recognized that in other embodiments, some of which are described more fully later in this document, different spacing, and different configurations of antennas can be used with essentially the same approach as is described with reference to FIG. 1.

The antennas 112 provide signals to a number of separate radio frequency (RF) signal chains. As shown in FIG. 1, there are B separate RF signal chains. The $n^{th}$ antenna produces a signal $h_n(t)$, which is represented as a complex quantity (i.e., the real and imaginary parts representing the two quadrature components). In general, the dependence on time is omitted, and the $n^{th}$ antenna signal is denoted $h_n$. Below, h denotes a column vector $(h_1, \ldots, h_N)^T$ of antenna signals received at the N antennas of the antenna array.

In each RF signal chain, the N antenna signals pass though a configurable phase adjustment component 120, which modifies the phase of each of the antenna signals. In this embodiment, the magnitudes are not adjusted individually, however, it should be understood that in other embodiments, the system may also provide limited or complete control of magnitude (gain), as well as phase, of the antenna signals. In this embodiment in which only phase is controlled, the $n^{th}$ antenna signal $h_n$ is modified by a phase $\phi_n$ 122, which in complex notation is represented as multiplication by $\exp(j\phi_n)$. Note that as illustrated in FIG. 1, each RF signal chain is provided to all N antenna signals as input. In other embodiments, fewer than all the antenna signals may be provided to each RF chain, for example, with each RF change being assigned a separate set of antennas, or the assigned sets partially overlapping.

The phase modified signals in a particular RF signal chain are summed in a summer 130, and then the time average magnitude of the sum is determined in a magnitude computation element 140. The result for the $b^{th}$ signal chain is therefore $$y_b = \left| \sum_{n=1}^{N} h_n \exp(j\phi_n) \right|$$

which can be represented in matrix notation as $$y_b = |a^b h|$$

where $a^b$ is the vector of complex phase adjustment terms for the $b^{th}$ signal chain.

Note that for a conventional beam-forming approach, for the N element array with one-half wavelength separation, adjustment of the phases in order to direct an antenna pattern to have a main directional lobe in a spatial direction $\theta$ is achieved by setting $\phi_n = (n-1)\pi \cos \theta$. Using the system shown in FIG. 1, with B signal chains, the system can determine the signal level arriving from B separate directions for one configuration of the of the phase adjustments $a^1$ through $a^B$ using such an approach to setting of the phase modifications. However, to consider N directions, N different antenna patterns are used, which if used in succession would require N/B time intervals of signal reception taking advantage of the B RF signal chains to scan all N directions.

Continuing to refer to FIG. 1, we assume that there are N signals $x_i$ arriving at the array at corresponding directions $\theta_i$, with a complex vector representing these signals being denoted $x = (x_1, \ldots, x_N)^T$. Based on the physical arrangement of the antennas, in matrix notation, the antenna signals are related to these arriving signals as $$h = F'x$$

where the entries of F' are complex with unit magnitude. In the case of a linear array with $d = \lambda/2$ spacing, F' is an inverse Fourier matrix. However, it should be understood that other arrangements than linear arrays (e.g., a circular array, a rectangular array) can be addressed in this manner, with F' having other forms when other antenna configurations are used. Furthermore, although described in the context of directions of arrival being in a single two-dimensional plane, three-dimensional directional determination uses essentially the same approach.

Because F' is invertible with inverse F also having unit magnitude complex entries, the vector of N signals $x_i$ can be reconstructed as $$x = Fh$$

and a particular direction signal can be reconstructed as $$x_i = F_i h$$

where $F_i$ denotes the $i^{th}$ row of F. Therefore, if the phase offsets are chosen as $a = F_i$, and the output is computed as $y = |ah|$, then the size of y reflects the magnitude of $x_i$. That is, if $x_i$ is zero, then y will be small, but not necessarily zero due to sidelobe response of the antenna pattern to signals from other directions. Note that the phase offsets may be chosen with a common random phase, as $a = F_i \exp(-2\pi t_r/N)$, for example for a random number $t_r$, without affecting the magnitude y.

Note that in general, most of the signals $x_i$ are zero because there is no direct or reflected path arriving from the transmitter in that direction. Therefore, the vector x is assumed to be sparse, for example, with only K out of N non-zero terms (this is referred to as "K-sparse").

The system 100 uses an approach that determines the directions of arriving signals without requiring scanning over the possible directions of arrival. Very generally, rather than using a multiple antenna patterns to scan the directions of arrival, with each antenna pattern having a single relatively narrow directional lobe in a particular direction, the system uses multiple antenna patterns with each antenna pattern having R>1 lobes. In each iteration of a series of iterations, the system makes use of B antenna patterns, which are formed using phase offsets $a^1, \ldots, a^b, \ldots, a^B$ such that the received values are determined as $y_b = |a^b h|$. The vector of these received values $y = Ah$, where the rows of A are the phase offsets $a^b$, is referred to as the "hash" of the signal directions. Through a suitable selection of the antenna patterns, the system uses $O(K \log N)$ antenna patterns, rather than $O(N)$ patterns, to identify K out of N directions of arrival.

As is described in substantially more detail below, a first aspect of an approach used by a beam acquisition controller 150 of the system is to set the phase offsets $a^1, \ldots, a^B$ such that (i) each corresponding antenna pattern has high gain in multiple lobes (generally R lobes), and (ii) together, the antenna patterns are "comprehensive" in that a signal arriving from any direction $\theta$ will be received with high gain via at least one of the antenna patterns. Generally, using such a set of antenna patterns, the signal magnitudes are used to determine a directional profile T(i), which is a positive function of the direction index i (or alternatively of the continuous or discretized direction $\theta$) such that the function has relatively larger values for directions that are consistent with the true directions of arrival of the signals. However, with one iteration there will generally remain ambiguity as to the true directions. Note that if there are fewer than B RF chains in an alternative embodiment, multiple sub-iterations may be performed sequentially to make use of all B patterns, for example, using one pattern at a time if there is only a single RF chain.

A second aspect of the approach involves performing a number (L) iterations, with a different set of antenna patterns being used at each iteration. Each iteration yields different directional information. However, when combined across the iterations, the resulting directions information T(i) output from the beam acquisition controller has low ambiguity, and can serve as a replacement of a scanning approach that would have taken more iterations to yield similar spatial accuracy.

A summary of the notation introduced above, as well as additional notation used later in this description is as follows:

x is a column vector $(x_1, \ldots, x_N)^T$ of (complex) arriving signals arriving at the antenna array from corresponding directions $\theta_1, \ldots, \theta_N$. In general, the vector is sparse in that most of the entries are zero or much smaller in magnitude than the other entries. The vector is referred to as "K-sparse" to denote that there are at most K such larger entries. The dependence on time for $x_i$, as in $x_i(t)$, is generally omitted, as it is for other signals as well.

h is a column vector $(h_1, \ldots, h_N)^T$ of (complex) antenna signals received at the N antennas of the antenna array. In matrix notation, the antenna signals are related to the arriving signals as h=F'x.

F' is a complex matrix that represents the phase offsets (as complex exponential terms with magnitude 1) introduced for signals arriving from the N directions $\theta_1, \ldots, \theta_N$. For example, with a uniformly spaced linear array of antennas separated by distance d, $[F']_{n,k}$=exp(j2πn(d−1)cos($\theta_k$)/λ). That is, F' is an inverse Fourier Transform matrix. (In general, matrix inverse is denoted by ')

a is a row vector of phase offsets (exp(j$\phi_1$), ..., exp(j$\phi_N$)) for application to the corresponding antenna signals ($h_1, \ldots, h_N$) for implementing a corresponding directional antenna pattern.

y is a non-negative real number computed as y=|ah|=|aF'x| as the received signal according to the directional antenna pattern determined by the phases a=(exp(j$\phi_1$), ..., exp(j$\phi_N$)).

y is a column vector $(y_1, \ldots, y_B)^T$ with received for B antenna patterns associated with B sets of phases offsets $a_1, \ldots, a_B$ represented as a matrix A such that y=|AF'x|.

R is the number of lobes over the directions $\theta \in [0, 180)$ in each antenna pattern.

B is the number of antenna patterns (i.e., the dimension of y), also referred to as the number of frequency "bins." In general, B is chosen to be equal to or greater than $N/R^2$. The phase settings for a particular bin b are denoted $a^b$.

ρ is a permutation of 1, ..., N such that index i is moved to ρ(i).

P is a generalized permutation matrix such that each row and each column has exactly one non-zero entry, and that entry is a complex quantity with magnitude 1.

I(b, i) is a magnitude square response of an antenna pattern resulting from phase offsets $a^b$ in a direction $\theta_i$.

T(i) is a directional profile over directions $\theta_i$ of possible directions of arrival.

Beam Design

As introduced above, the antenna pattern for a particular RF signal chain and a particular iteration is controlled by the phase offsets a producing an antenna pattern with R lobes. A procedure for setting the phase offsets that is used in this embodiment segments the vector of phase offsets a into R segments, each with N/R contiguous entries. The $r^{th}$ segment is associated with a lobe direction index $s^r$ (i.e., direction $\theta_{s^r}$), and is formed from the row $F_{s^r}$. That is, the $r^{th}$ segment of a has entries $a_i$ chosen as $a_i = F_{s^r, i} \exp(-2\pi t_r/N)$ where $(r-1)N/R < i \leq rN/R$ and $F_{s^r, i}$ is the element at row $s^r$ and column i of F, and $t_r$ is chosen at random for each segment.

For a particular antenna pattern, one consideration in selecting the directions $s^1, \ldots, s^R$ is such that sidelobes of the part of the pattern for a directions $s^i$ falls on another direction $s^j$ of the same pattern.

In some embodiments, the directions are chosen to be uniformly spaced according to the cosine of the angle. For example, the angles are chosen such that $\theta_i = \cos^{-1}(2i/N)$ for $-N/2 \leq i \leq N/2$ which for N=16 can be indexed from i=−7 to i=8 to yield the angles (rounded)

θ=(151,139,129,120,112,105,97,90,83,76,68,60,51,41,29,0)

Figure 2:
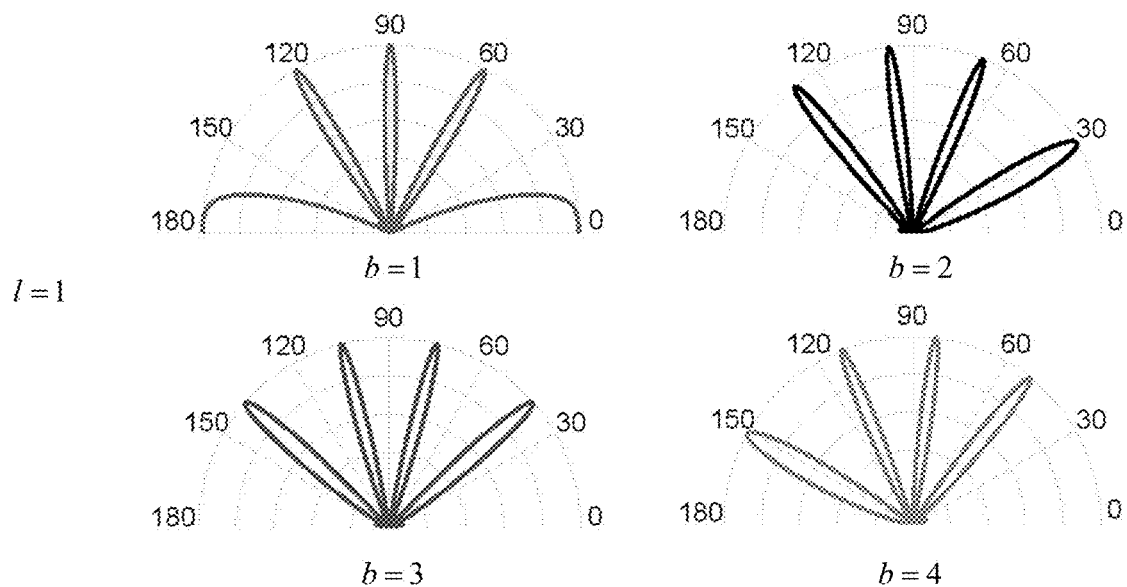
FIG. 2 is a set of antenna patterns for B=4 patterns, each with R=4 lobes.

One approach to construct the B patterns is to select different subsets of the directions for each pattern. Referring to FIG. 2, the selection of direction indexes for this choice of N=16 directions, denoted $s_b$ as the direction indexes for the $b^{th}$ pattern, may be chosen as $s_1 = (-4, 0, 4, 8)$ $s_2 = (-5, -1, 3, 7)$ $s_3 = (-6, -2, 2, 6)$ $s_4 = (-7, -3, 1, 5)$ Note that over the B patterns, all N=16 directions are represented, with each direction represented in exactly one pattern. In the example illustrated in FIG. 2, the spacing of antennas is assumed to be one-half of a wavelength, therefore a lobe at θ=0 results in a corresponding lobe at θ=180. Furthermore, not illustrated are the lobes over the range of directions from 180 degrees to 360 degrees, recognizing that for each pattern, there are in fact 2R lobes over the full range of directions (i.e., each lobe at $\theta_i$ is associated with a corresponding lobe at $-\theta_i$). However, the focus of the description below is on acquisition of angles in the range 0 to 180 degrees.

Using the procedure described above, for a set of directions $s_b$, the corresponding phase offsets $a^b$ determined using the segmentation approach described above are used to determine $y_b = |a^b h|$ for b=1, ..., B.

The information characterizing the direction(s) that are represented in these signals is determined using a combination approach in which the response to each signal direction i with antenna pattern b is precomputed as $I(b, i) = |a^b F'_i|^2$.

Referring to FIG. 2, the antenna pattern functions I(b, i) (plotted versus θ rather than direction index i) are shown. These plots show that the lobes of the B patterns do not overlap, and together if combined comprehensively cover the entire range of θ from 0 to 180 degrees.

For one iteration, a directional response profile T(i) may be computed from the received magnitudes $y_b$ in a variety of ways. One approach is a "soft voting" approach in which $$T(i) = \sum_{b=1}^{B} y_b^2 I(b, i)$$

which is optionally normalized by the sum $\Sigma_b y_b^2$. In other embodiments, a "hard voting" approach may be used in which T(i) is selected as I(b*, i) for the pattern b* with the largest magnitude $y_{b*}$.

Note that after one iteration, even with only a single direction being represented in the received signals x, there is ambiguity in the possible directions represented by T(i). Generally, one of the $y_b$ is substantially larger than the others, which may be small but non-zero because there is "leakage" between the antenna patterns. Furthermore, for that pattern, b, the response pattern I(b, i) is large for about $R^2$ values of i.

Generally, in the case of phase-only control on the antenna signals, because N/R antennas are used for a particular lobe, the lobe for direction $s^r$ has substantial response for a width of R directions around $s^r$. With R lobes in one antenna pattern, the pattern essentially covers $R^2$ of the N directions. Therefore a group of $B \geq N/R^2$ antenna patterns may be used to together comprehensively cover all the N directions. In this example, $B=N/R^2$ and with this selection of angles the four antenna patterns provide comprehensive coverage of the directions.

Beam Pattern Iteration

As introduced above, with B antenna patterns, the resulting response T(i) after one iteration will in general exhibit substantial ambiguity regarding the direction(s) of received signals (i.e., there may be multiple modes in the distribution T(i)). Therefore, an iterative approach is used in which at each iteration, a different set of B antenna patterns are used to hash the received signal, and the responses from the iterations are combined.

Figure 3:
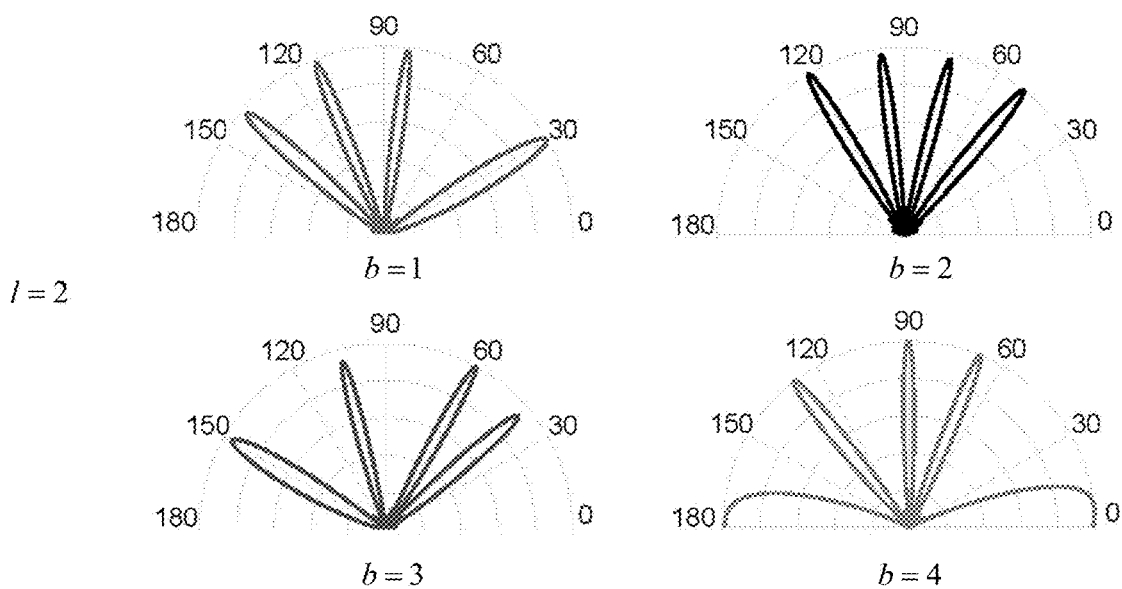
FIG. 3 is a set of antenna patterns resulting from permutation of the patterns shown in FIG. 2.

On the first iteration, the procedure yields a vector $y^{(1)} = |A^{(1)}h|$ as the "hash" of the directions of arrival of the signals, which informs the directional response T(i). A goal of each iteration is to yield new information about the directional response in a series of further hashes $y^{(l)}$ for l=2, . . . , L. Generally, an approach to avoiding generating merely redundant information is to form these hashes in a random manner, essentially by choosing the set of beam patterns at random at each iteration, maintaining the structure that each beam pattern has R lobes and that together, the beam patterns at any iteration are comprehensive covering all N directions. The beam patterns for the $l^{th}$ iteration are characterized by the phase offset matrix $A^{(l)}$, each row of which provides one set of phase offsets corresponding to one entry in the vector hash $y^{(l)}$. Referring to FIG. 3, antenna patterns for a second iteration are selected in a manner to provide additional information through a second hash of the received signals.

One systematic approach to computing each randomized matrix of phase offsets $A^{(l)}$ for l>1 is to randomly transform the beam patterns defined by $A^{(1)}$ used in the first iteration. As discussed below, one approach to form this random transformation of the beam patterns is for the transformation to correspond to a random permutation of the directions in which each of lobes of the beam patterns are responsive. In particular, a permutation of the direction indexes, ρ, is selected, and the beam patterns are essentially transformed such that if a beam pattern had a lobe in direction i in the first iteration, in the current iteration, it has a lobe at direction ρ(i). Because ρ is a permutation, each beam pattern retains the property that it has R lobes, and together the beam patterns retain the property that they are comprehensively covering all N directions.

One approach to selecting a permutation ρ for the $l^{th}$ iteration, and with it determining the corresponding modified phase offset matrix $A^{(l)}$ as a transformation of the first iteration matrix $A^{(1)}$, makes use of a property of Fourier matrices. When the antenna array has a linear arrangement of N antennas and the directions are chosen to be uniformly spaced in cos θ, as described above, then F is a Fourier matrix, such that the vector of antenna responses can be represented as h=F'x (as presented above). Consistent with the property of Fourier matrices, scaling the indices of the entries of the input signals x such that $\hat{x}(i)=x(\sigma i)$ (the multiplication by the integer σ being performed modulo N) results in the entries of the antenna response also being scaled as $\hat{h}(j)=h(\sigma^{-1}j)$. As a result, if phase offsets a, which when applied to h corresponds to a beam pattern with lobes with direction indices $s^1, \ldots, s^R$, when applied to h corresponds to a beam pattern with direction indexes $\sigma s^1, \ldots, \sigma s^R$, where the multiplications are computed modulo N. In this example, the permutation corresponds to $\rho(j)=\sigma^{-1}j$ mod N, such that $\hat{h}(j)=h(\rho(j))$.

The permutation ρ can be represented as a matrix P, in which each row and each column of P has one non-zero entry, which in the case of scaling by an integer mod N as introduced above is equal to 1. Specifically, for the permutation $\rho(j)=\sigma^{-1}j$ mod N, the column i, row at entry (indices computed mod N) of P is 1 for i=1, . . . , N. Therefore, the permutation of the inputs may be represented as $\hat{x}=Px$ and therefore the permuted antenna signal can be represented as $\hat{h}=F'Px$. Applying the original phase offsets A defining the original beam patterns to the permuted antenna signals, as $y=A\hat{h}$, effectively hashes the original signals with a permuted antenna pattern. However, the elements of the input signal x cannot actually be permuted, and therefore the identity $$y=|A\hat{h}|=|AF'Px|=|AP'F'x|=|(AP')h|$$

provides equivalent ways of computing the hash h under the permutation of the inputs which is equivalent to permutation of the directions of the beam pattern lobes. Therefore, under the permutation ρ and associated permutation matrix P, the matrix of phase offsets A is replaced by AP', or equivalently, each phase offset vector $a^b$ is replaced by $a^bP'$.

More generally, P' may be a generalized permutation matrix in which each row or column of P' contains exactly one non-zero entry, and that entry has unit magnitude. The matrix P' defined as in [2]: the i-th column of P' contains the value $\omega^{a\sigma i}$ in the row σ(i–b), where $\omega=e^{2\pi j/N}$ and a, b, σ are randomly chosen parameters. This has the effect of rearranging the vector x by moving the entry $x_i$ to $x_{\rho(i)}$ for $\rho(i)=\sigma^{-1}i+a$, and multiplying it by $\omega^{bj+\sigma ba}$.

As presented above, in the absence of a permutation, the directional response for beam pattern b in the direction with index i is $$I(b,i)=|a^bF'_i|^2.$$

Now with the permutation ρ, the modified directional response (i.e., with $a^b$ replaced by $a^bP'$) is $$I(b,i)=|a^bF'_{\rho(i)}|^2.$$

The responses T(i) defined above with a subscript l denote the iteration in which it is computed, the overall response, over L iterations the overall response may be combined as $$T(i) = \prod_{l=1}^{L} T_l(i)$$

In the two-iteration example shown in FIGS. 2 and 3, a signal arriving from θ=60° results in T(i) having a single peak at 60°.

Beam Acquisition Procedure

Figure 4:
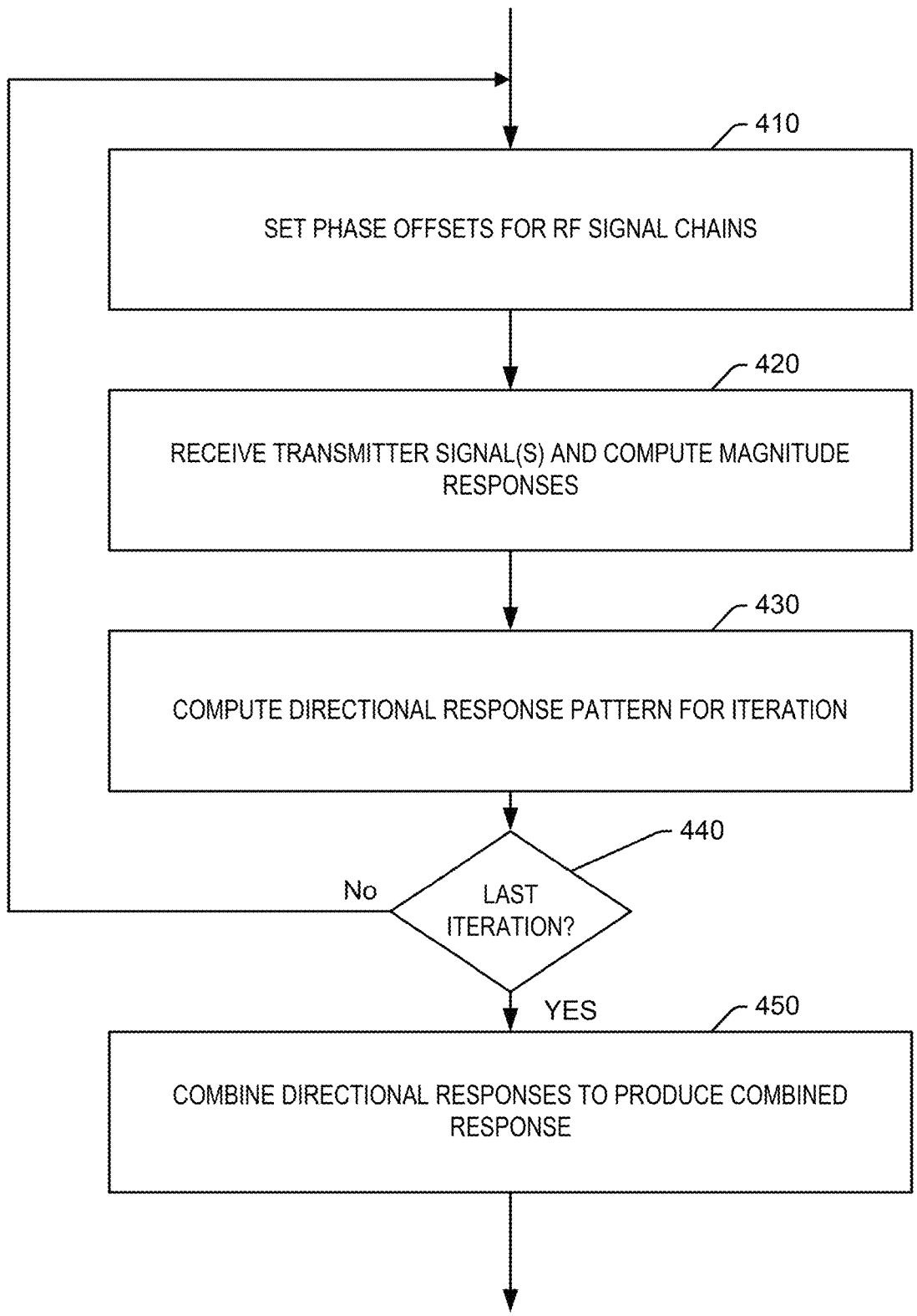
FIG. 4 is a flowchart of a multiple iteration beam acquisition procedure.

The approach described above may be summarized in the flowchart shown in FIG. 4. In this example, the transmitter transmits a radio signal at each iteration using an omnidirectional or quasi-omnidirectional antenna pattern. In general, that transmission reaches the receiver (system 100 shown in FIG. 1) in a small number of directions, for example, resulting from reflections in the environment. Steps 410-430 of FIG. 4 are performed once per iteration. In step 410, the receiver sets the phase offsets $A=(a^1, \ldots, a^B)$ for the B signal chains. At step 420, the system receives the transmission and computes the magnitudes $y=(y_1, \ldots, y_B)^T$, and then at step 430 computes the directional response $T_l(i)$ based on the antenna patterns and received magnitudes in that iteration. At step 440, if this is the last of L iterations (where L may be set based as described below) the procedure continues to step 450, otherwise the next iteration is begun with step 410, where the phase offset are set according to the random permutation approach described above. At step 450 after the last iteration, the directional responses are combined, and the resulting directional response T(i) is provided as output.

In general, the number of iterations L is preset as a multiple of (K/B)log N, where K is the expected number of directions from which the signal may arrive.

Transmitting Direction

The approach described above is in the context of a receiver determining a direction of arrival of a signal from a transmitter, which uses a fixed transmission antenna pattern for all the transmissions received at the receiver. Essentially the same procedure may be used to determine the best direction to transmit from a transmitter to a receiver, essentially exchanging the roles of the transmitter and the receiver. References to a "propagation direction" from an antenna array should be understood to generically include either or both of a transmitting direction or a receiving direction.

In the receiver direction acquisition case, there are BL scalar hash values, denoted $y_b^{(l)}$ for the $b^{th}$ antenna pattern for the $l^{th}$ iteration. The transmitting direction case, BL scalar hash values are also determined. Here, the transmitter makes BL separate transmissions, in groups of B transmissions each using a different antenna pattern (i.e., adjusting the phases with the same have vectors $a^b$). The receiver has knowledge of the beam patterns used by the transmitter, for example, because the patterns are prearranged, or because the transmitter identifies them to the receiver via transmitted data. In any case, using the measured signal magnitudes $y_b^{(l)}$ and the directional information for each beam pattern used by the transmitter, the receiver determines the directional profile T(i), and feeds back the profile or the estimated direction to the transmitter.

Note that the transmitter, having received the direction information from the receiver sets the transmitting direction (i.e., the phase offsets for the antenna array) to transmit to the receiver. If the transmitter is part of a transceiver that can also receive signals from the other station (i.e., the receiver during the direction acquisition procedure), the same propagation direction is set at the transceiver to receive transmissions from the other station. That is, in both the receiver direction acquisition procedure, and the transmitter direction acquisition procedure, what is determined is a propagation direction, which may be used for both transmission and reception of signals (e.g., assuming that both directions use the same or close frequencies, which exhibit the same or similar directional and multipath characteristics in the environment).

Multi-Transmission Omni-Directional Emission

In the case of a receiver determining a direction of arrival from a transmitter, the discussion above essentially assumes that the transmitter is using an omni-directional antenna pattern, for example, because the transmitter does not know the best direction in which to transmit to the receiver. However, in many cases, if the transmitter uses an antenna array (e.g., a linear array), it is not feasible for the transmitter to form an omni-directional pattern by adjusting phases of the array.

An alternative is for the transmitter to make a sequence of B transmissions (not necessarily the same value of B used by the receiver in determining the direction of arrival), with each transmission using a different beam pattern. A requirement is that the combination of these beam patters comprehensively cover the directions, therefore when averaged over the B transmissions, the overall pattern forms a more uniform omnidirectional pattern than might be achievable in one transmission by adjusting the transmission phases of the antennas.

At the receiver, for each receive antenna pattern b, and for each transmitting antenna pattern b', the receiver determines a received magnitude $y_{b,b'}$ using the approach described above. Then the receiver sums over the transmit patterns to determine the overall response $y_b = \Sigma_{b'} y_{b,b'}$ to essentially simulate a single transmission using an omni-directional pattern. Then the remaining procedure continues as described above.

Antenna Arrays on Both Transmitter and Receiver

In some situations, two transceiver stations each have antenna arrays, and each seeks to determine the best propagation direction (i.e., the best transmit and receive direction) in which to communicate with the other station. One approach is for one transceiver to act as the receiver, and one transceiver to act as the transmitter, and to jointly apply procedures described above.

In each of L iterations, the transmitter (i.e., the transceiver taking the role of the transmitter in the procedure) makes B' transmissions, each with a different antenna pattern, b'. The receiver (i.e., the transceiver taking the role of the receiver in the procedure) receives this transmission (or successive transmissions with the same pattern b') with B different antenna patterns. The result is that the receiver has B×B' magnitudes $y_{b,b'}$. For the receiver, summing over the B' antenna patterns as $y_b = \Sigma_{b'} y_{b,b'}$ yields the magnitude used for the receiver's procedure described above, essentially treating the B' transmissions as providing an overall omni-directional emission pattern. For determining the transmitter's direction information, the receiver sums $y'_{b'} = \Sigma_b y_{b,b'}$. The receiver determines the transmitters direction profile using the $y'_{b'}$ using the transmitting direction procedure described above, essentially summing over the receive beam patterns to achieve an overall omni-directional receiving pattern. After L iterations, the receiver determines the receive direction in which to receive transmissions from the transmitter, and that it will also use for transmissions in the opposite direction. The receiver also feeds back the transmission direction to the transmitter, which uses that direction for transmission, as well as receiving in the opposite directions.

Assuming that the receiver has B receive RF signal chains, a total of B'×L transmissions are used. If each transceiver has only a single RF chain, B×B'×L transmissions are used (plus any used to pass direction data between the stations).

Note that the described approach has each transceiver take the role of either a transmitter or a receiver for all L iterations, and for sub-iterations within each iteration. But it should be recognized that the transceivers can switch roles for particular iterations and sub-iterations, nevertheless acquiring the has values $y_{b,b'}$ between them, and with suitable exchange of the hash values of directional information derived from the hash values, can determine the propagation directions using a variant of the procedure described above.

Implementation and Results

An embodiment of the approach presented above, referred to herein as Rapid-Link, uses a full-fledged mmWave radio capable of fast beam steering. The radio operates in the new 24 GHz ISM band and serves as a daughterboard for the USRP software radios. Its physical layer supports a full OFDM stack up to 256 QAM. Our implementation addresses critical system and design issues that are described below.

Heterodyne Architecture

Millimeter Wave hardware is significantly more expensive than GHz hardware. Thus, we leverage a heterodyne architecture where the mmWave signal is first taken into an intermediate frequency of a few GHz, before the I and Q (real & imaginary) components are separated. Such a design reduces the number of components that need to operate at very high frequencies (e.g., mixers, filters, etc) and replaces them with components that operate at a few GHz, which are much cheaper.

The architecture of Rapid-Link's receiver is shown in FIG. 5(b). The first block is a mmWave phased array which allows us to steer the beam electronically. The array consists of antenna elements where each element is connected to a phase shifter. The outputs of the phase shifters are combined and fed to a single mmWave front-end. The front-end has a standard design of a low-noise amplifier (LNA), band-pass filter, mixer, and a PLL. The mmWave front-end down-converts the mmWave signal to an intermediate frequency (IF) and feeds it to the daughterboard on the USRP, which samples it and passes the digitized samples to the UHD driver. This enables easy manipulation of mmWave signals using standard GNU-radio software and allows us to build an OFDM stack that supports up to 256 QAM.

Figure 5:
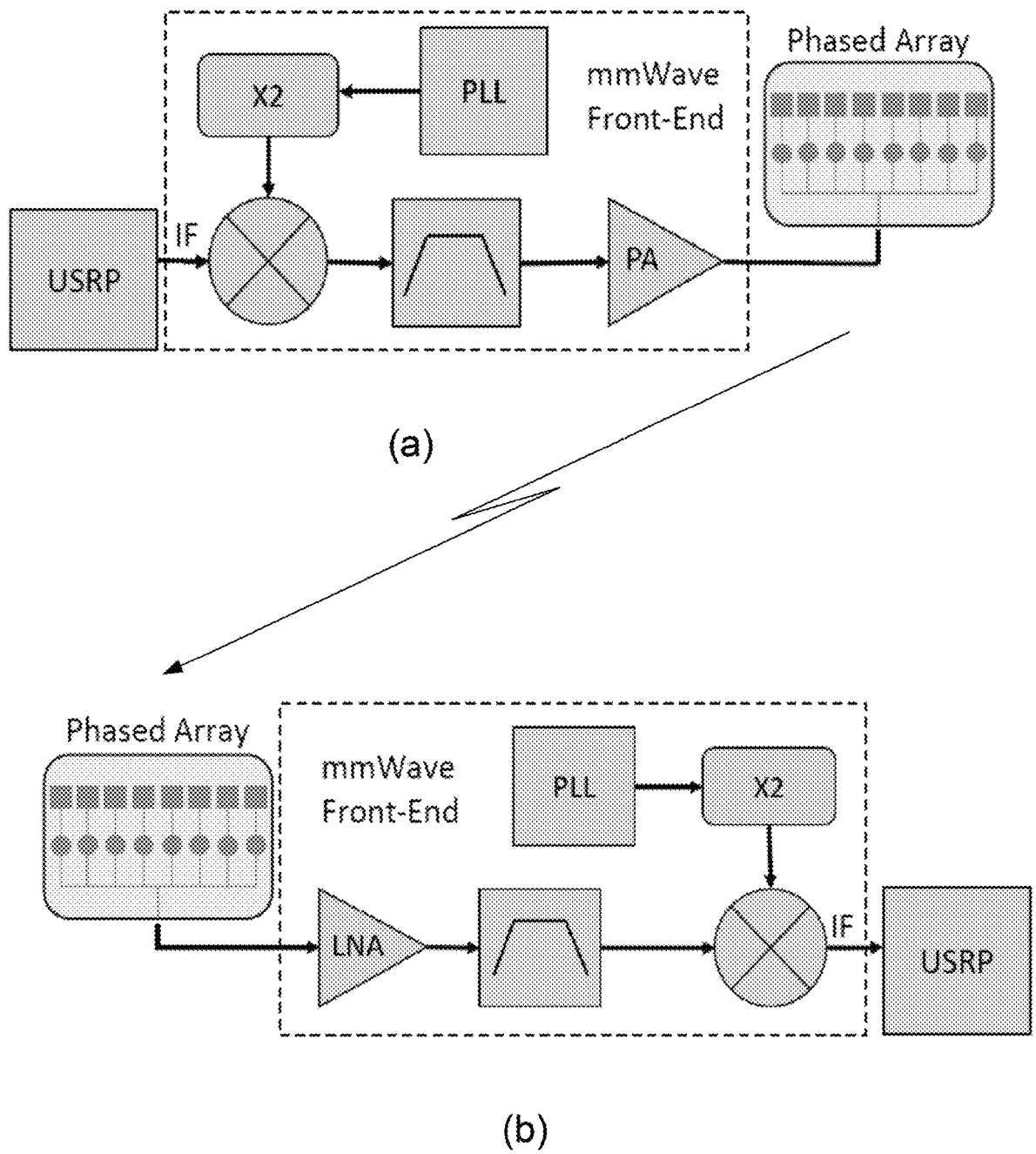
FIG. 5 is a pair of block diagrams for both a transmitter (a) and receiver (b).

The design in FIG. 5 uses off-the-shelf components. For the mmWave low-noise amplifier (LNA) and power amplifier (PA), we use Hittite HMC-C020 and Quinstar QLW-2440, respectively. For the mmWave mixer, we use Marki M1R-0726MS. To generate local oscillator (LO) signals, we use Analog Devices ADF5355 PLL and Hittite HMC-C035 frequency doubler. The phased array includes 8 antenna elements separated by $\lambda/2$, where each element is connected to a Hittite HMC-933 analog phase shifter. We use Analog Device AD7228 digital-to-analog converters (DAC) and an Arduino Due micro-controller board to digitally control the phase shifters.

Radio Performance

Figure 6:
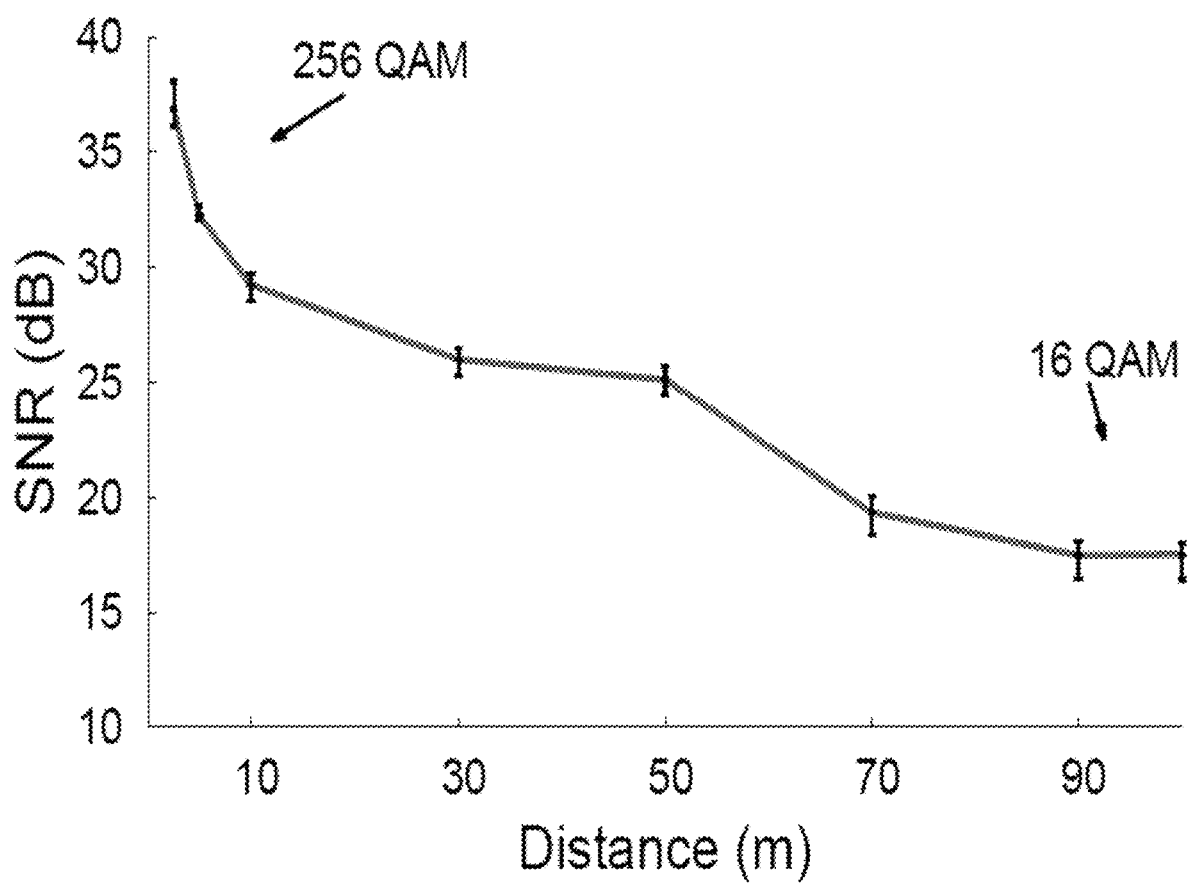
FIG. 6 is a plot of SNR at the receiver versus distance between the receiver and the transmitter.

To test Rapid-Link's ability to deliver high data rates and long range using phased arrays, we measure the SNR of the received signal for different distances between Rapid-Link's receiver and transmitter where the transmit power complies with FCC part15. FIG. 6 shows the SNR at the receiver versus the distance between transmitter and receiver. The figure shows that Rapid-Link's implementation provides SNR of more than 30 dB for distances smaller than 10 m and 17 dB even at 100 m which is sufficient for relatively dense modulations such as 16 QAM [7].

Experimental Evaluation

We evaluate Rapid-Link's ability to identify the best beam alignment quickly and accurately. We ran experiments in a lab area with standard furniture (desks, chairs, computers, etc.). We also ran experiments in an anechoic chamber, where we can accurately measure the ground truth. The anechoic chamber walls are covered with RF absorbers to eliminate multipath and isolate the space from exterior interference. This isolation is necessary to measure the ground truth path traveled by the signal without having RF reflections.

We compare the following three schemes:

Exhaustive Search: In this approach, for each setting of the transmitter's beam direction, the receiver scans all different directions. The combination of transmitter and receiver beams that delivered the maximum power is picked as the direction of the signal.

802.11ad Standard: The standard has three phases[3]. The first stage is called Sector Level Sweep (SLS). In this stage, the AP transmits in all possible directions, and the client sets its receiver beam pattern to a quasi-omnidirectional beam. The process is then repeated with the AP setting its receiver antenna to quasi-omnidirectional and the client sweeping through all transmit directions. At the end of this stage, the AP and client each pick the $\gamma$ directions that deliver the largest power. The second stage is called Multiple sector ID Detection (MID). This stage repeats the process above but with the transmit beam set to quasi-omni-directional and the scan being performed with the receive beam. This stage compensates for imperfections in the quasi omnidirectional beams. The third stage is called Beam Combining (BC). In this stage, each of the $\gamma$ best directions at the AP are tried with each of the $\gamma$ directions at the client. Hence, $\gamma^2$ combinations are tested and the combination of transmit and receive beam directions that deliver the maximum power is then selected and used for beamforming during the data transmission. In our experiments, we set $\gamma=4$.

Rapid-Link: We run the algorithm described above where the total number of measurements is set to $K^2 \log N$, where N is the number of possible signal directions. We set K to 4 since past measurement studies show that in mmWave frequencies the channel has only 2 to 3 paths [4, 1, 5, 6].

Evaluation Metrics

We evaluate the performance of Rapid-Link's beam searching algorithm along two axes. The first is the accuracy in detecting the best alignment of the receiver's and transmitter's beams. In this case, our metric is the SNR loss in comparison to the optimal alignment, i.e., how much SNR could we have gained had we known the ground truth. We calculate this metric by measuring the SNR achieved by our beam alignment and subtract it from the SNR achieved by the optimal alignment.

$$SNR_{loss} = SNR_{optimal} - SNR_{Rapid\text{-}Link} \qquad (1)$$

The lower the SNR loss, the higher is our accuracy in detecting the direction of the signal. In order to measure the optimal SNR, we ran experiments in an anechoic chamber where there is no multipath and we can accurately measure the ground truth direction of the signal and align the beams along those directions. However, we also ran experiments in multi-path rich environments. In this case, since we do not know the ground truth, we compute the SNR loss metric relative to the exhaustive search baseline described above.

$$SNR_{loss} = SNR_{Exhaustive} - SNR_{Rapid\text{-}Link} \qquad (2)$$

The second metric is the latency in identifying the correct beam alignment in comparison to exhaustive search and the 802.11ad standard.

Beam Alignment Accuracy vs. The Ground Truth

As described above, we first run the experiments in an anechoic chamber, where we can accurately measure the ground truth. For each experiment, we place Rapid-Link's transmitter and receiver at two different locations. We then change the orientation of the transmitter's and receiver's antenna arrays with respect to each other. Since there is only a single line-of-sight path in the anechoic chamber, this path will appear at a different direction at the transmitter and at the receiver depending on the orientation of the antenna arrays. Hence, this allows us to test any combination of directions from which the strongest path can leave the transmitter and arrive at the receiver. For each setting, the transmitter transmits measurement frames (as required in 802.11ad) which the receiver uses to compute the directions of the best beam alignment. We then steer the beams based on the output of the alignment and measure the SNR achieved by this alignment.

Figure 7:
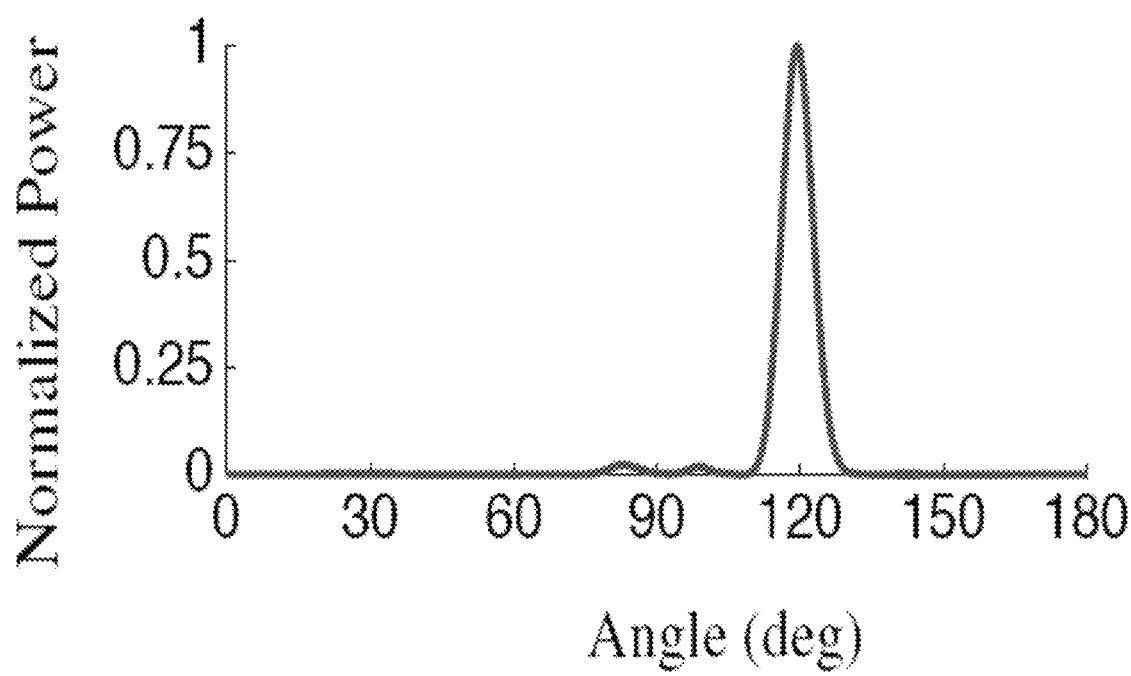
FIG. 7 is a pair of plots showing (a) a direction of arrival and (b) a direction of departure.
Figure 7:
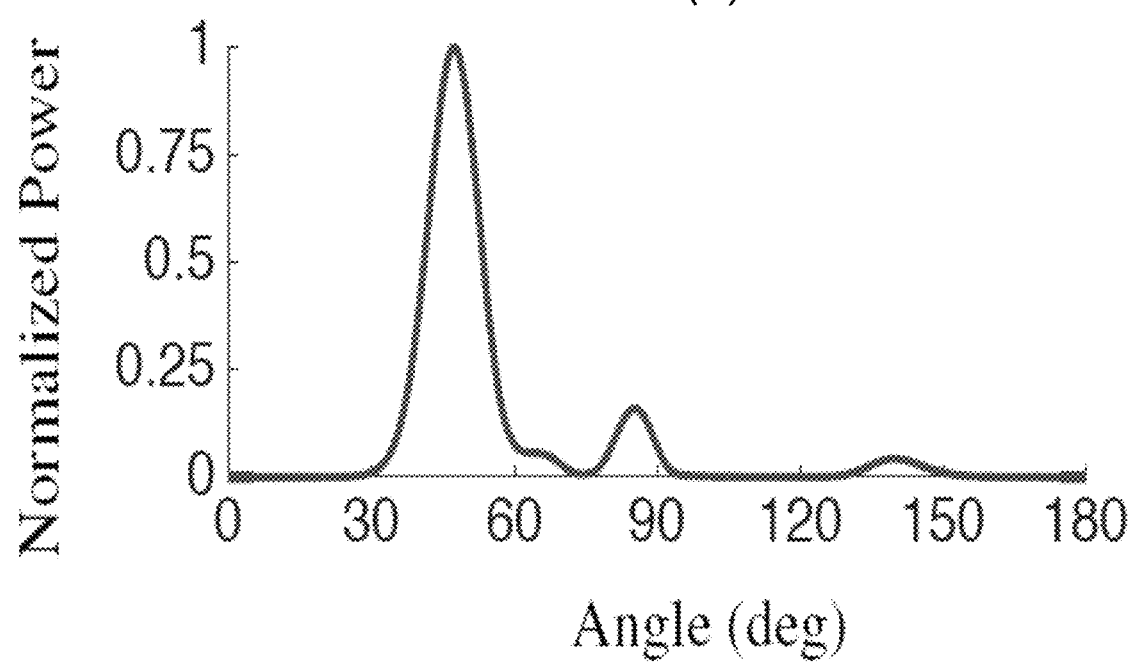

We first show the best alignment detected by Rapid-Link for a particular scenario, where we set the transmitter to be at an angle of 120° with respect to the receiver's array, and the receiver at an angle of 50° with respect to the transmitter's array. FIG. 7 shows the signal direction recovered by Rapid-Link on the transmitter's and receiver's sides for this scenario. As can be seen in the figure, Rapid-Link has accurately identified the direction of arrival of the signal at the receiver as 120°, and the direction of departure of the signal from the transmitter as 50°.

Figure 8:
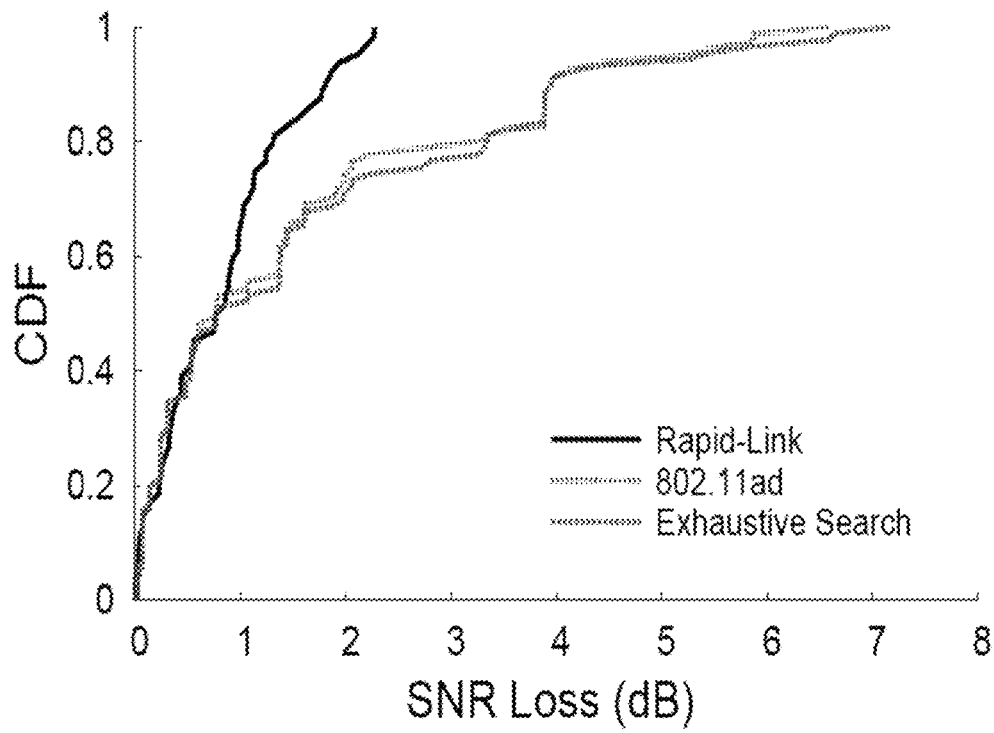
FIG. 8 is a plot of beam accuracy with a single path.

Next, we compare Rapid-Link's algorithm with the exhaustive search and the 802.11ad standard. To do so, we repeat the above experiment by changing the orientation of the transmitter's and receiver's antenna arrays with respect to each other. We try all possible combinations of the antennas' orientations, by rotating each antenna array with respect to the other for all angles between 50° and 130° with increments of 10°. FIG. 8 plots a CDF of the SNR loss for Rapid-Link's beam searching scheme, the exhaustive search and the 802.11ad standard, in comparison to the optimal alignment. The figure reveals two interesting points:

The figure shows that Rapid-Link performs better than the two baselines in that it has minimal SNR loss. While all schemes have a median SNR loss below 1 dB, the $90^{th}$ percentile SNR loss for both exhaustive search and the standard is 3.95 dB which is higher than the 1.89 dB SNR loss of Rapid-Link. This is due to the fact that the standard and exhaustive search choose to steer using the best beam from a discrete set of N beams which they tested. However, the space of beam directions is continuous and the best beam may not exactly align with the discretization chosen by the algorithms. In this case, they will end up picking the closest beam in the discrete set, which may not be the exact optimal one. SNR loss is further exacerbated by the fact that this can happen on both sides i.e., the transmitter and the receiver. In contrast, Rapid-Link uses the beams as a continuous weight over the possible choice of directions and picks the direction that maximizes the overall weight. Thus, Rapid-Link can discover the direction of the path beyond the N directions used by exhaustive search and the standard.

The figure also shows that the standard and exhaustive search have similar performance. This might seem surprising since one may expect exhaustive search to find a better beam alignment since it spends more time searching the space. However, it is important to recall that the standard differs from the exhaustive search only in the first stage where it uses a quasi-omnidirectional beam to limit the search space to a few top candidates. In the final the stage, however, the standard tries all possible combinations of these candidate beams. Since there is only one path in this experiment, as long as the best beam is picked as one of the candidate beams in the first stage, the standard will converge to the same beam alignment as the exhaustive search. However, we will show next that this does not continue to hold in multipath settings.

Alignment Accuracy in Multipath Environments

We repeat the above experiments in an office environment, where due to multipath, the signal can arrive from different directions. However, as described earlier, in this case, we do not have the ground truth for the direction of strongest path and hence we measure the SNR loss relative to the exhaustive search baseline. Note that since exhaustive search exhaustively tries all possible combinations of directions, it is not sensitive to multipath and maintains its performance.

Figure 9:
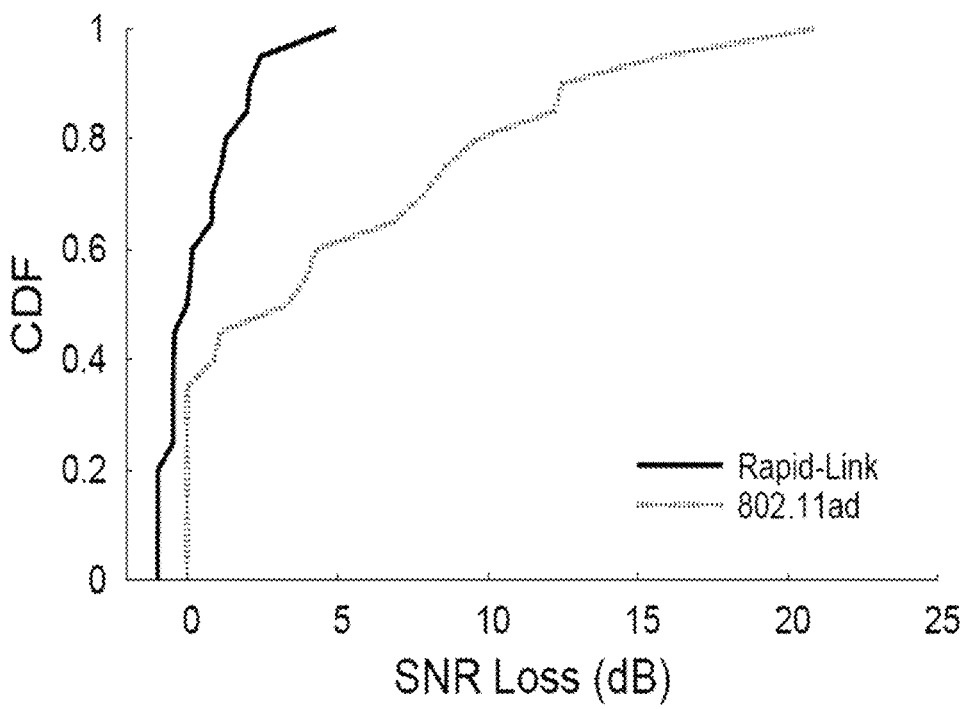
FIG. 9 is a plot of beam accuracy with multipath.

FIG. 9 plots a CDF of SNR loss for Rapid-Link and the 802.11ad standard with respect to the exhaustive search. The figure shows that the standard performs much worse in multipath scenarios. Specifically, instead of having a similar SNR to the exhaustive search as before, the median and $90^{th}$ percentile SNR loss (with respect to exhaustive search) are 4 dB and 12.5 dB, respectively. This is because the standard is using its phased array as a quasi-omnidirectional antenna and hence the multiple paths can combine destructively, in which case the information is lost. Further, due to imperfections in the quasi-omnidirectional patterns, some paths can get attenuated and hence the standard can easily choose the wrong direction to align its beam. In contrast, Rapid-Link performs well even in the presence of multipath. Specifically, the median and $90^{th}$ percentile SNR loss with respect to exhaustive search are 0.1 dB and 2.4 dB, respectively. Finally, the figure also shows that sometimes Rapid-Link's SNR loss with respect to exhaustive search is negative. This is because in some cases, Rapid-Link performs better than exhaustive search for the same reasons described above.

Beam Alignment Latency

Next we would like to evaluate the gain in reducing latency that Rapid-Link delivers over the two baselines. However, since our radio has a fixed array size we cannot empirically measure how this gain scales for larger arrays. Hence, we perform extensive simulations to compute this gain for larger arrays and we use the empirical results from our 8-antenna array to find the delay for this array size.

Figure 10:
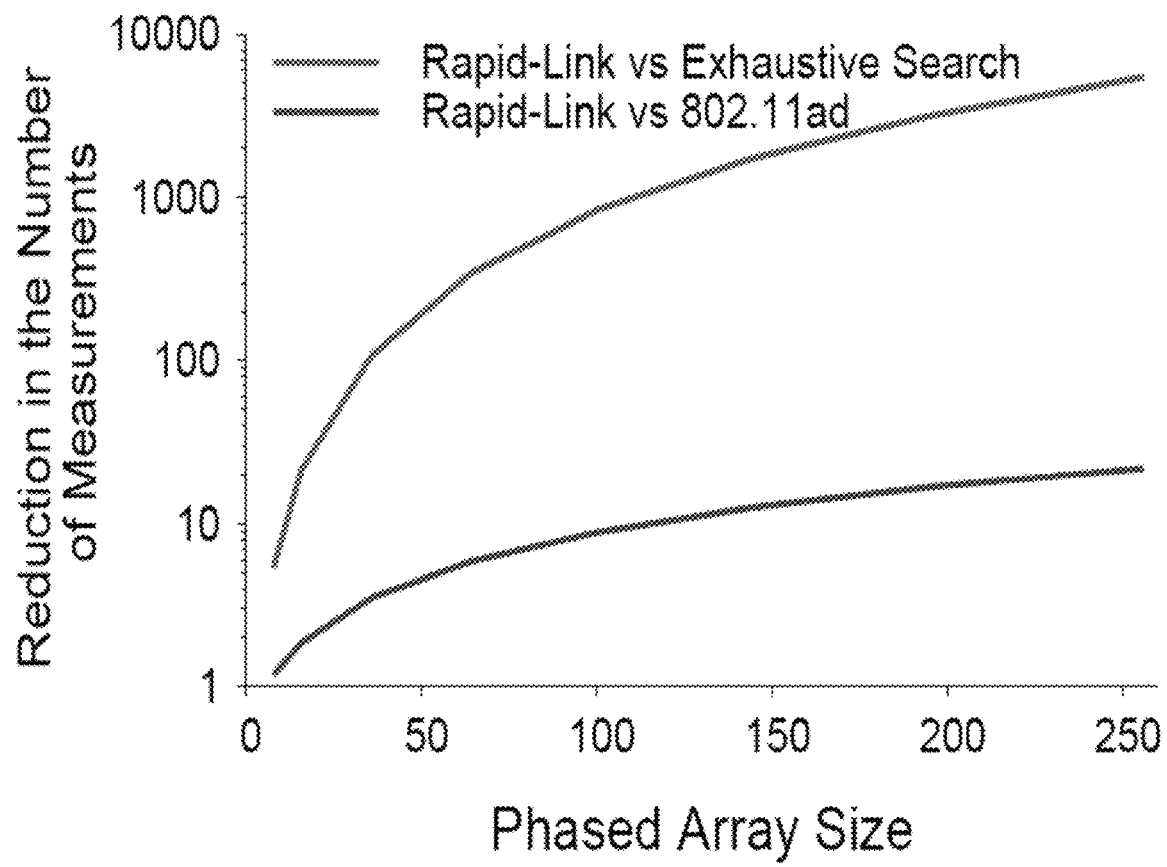
FIG. 10 is a plot of beam alignment latency.

Reduction in the Number of Measurements:

Since each measurement in 802.11ad requires sending a special frame, one way to measure delay is in terms of the number of measurements frames. FIG. 10 plots the reduction in the number of measurements that Rapid-Link achieves over exhaustive search and the standard. The figure shows that, for an 8-antenna phased array, Rapid-Link can reduce the number of measurements by 7× and 1.5× compared to exhaustive search and standard respectively. Further, the gain increases quickly as the number of antennas increase. This is due to the scaling property of each algorithm and whether it is quadratic, linear, or logarithmic. The figure shows that the gain of Rapid-Link over exhaustive search and the standard increases very fast and for arrays of size 256 is 16.4× better than the standard and three orders of magnitude better than exhaustive search.

Alternatives

In the description of the embodiment above, the method for forming an R-lobe beam makes use of segmentation of the phase offsets, and combining segments for different directions. Other approaches may be used. For example, an optimization of phase setting may be used to achieve an antenna pattern with desired lobe directions and widths, for example, using an optimization procedure such as a Genetic Algorithm (GA), which is tolerant of the highly non-convex nature of the optimization. In some examples, the segmented approach is used to initialize a further optimization. In some examples, the multiple antenna patterns that provide comprehensive coverage of the direction space are optimized jointly.

Although described in the context of a uniform spacing linear array, the approach is equally applicable to other array structures. For example, a non-uniform spacing or circular rather than linear structure may be used. Furthermore, although described in the context of a scalar direction (i.e., a direction acquisition in a two-dimensional plane) the approach is equally applicable to beam acquisition in the context of a two dimensional antenna array, for example, a square array, with the directions being characterized by angles in two orthogonal directions.

In the case of a three-dimensional problem of acquiring two directional angles, very generally, a set of three-dimensional multi-lobe patterns may be used at each iteration, and the directional profile T( ) is a function of two angles. In the case of a rectangular array (e.g., a square array), the problem may be decomposed in the two axes (referred to as the x and y axes for convenience). In this discussion, we assume that each axis has the same number of antennas, and therefore there are $N^2$ antennas, and we assume that there are the same number of patterns (B) and the same number of lobes (R) on each axis, but it should be understood that different values may be used for each axis, and it should be evident how the procedure is modified to accommodate this difference.

In this alternative embodiment, there are N×N antennas in a square array, and $B^2$ patterns, each with $R^2$ lobes are used. The phase offsets are determined by forming an R-lobe pattern on each axis, and combining the phase offsets for each axis to form the phase offsets for an $R^2$-lobe pattern. In the case of the receiver performing the iterations, the hash has $B^2$ entries, which may be denoted $y_{bx,by}$. These values may be summed for each axis, for example, $y_{bx} = \Sigma_{by} y_{bx,by}$, and two directional profiles, $T_x(i)$ and $T_y(i)$ determined separately at each iteration. Over the L iterations, an angle along each axis is determined separately, thereby acquiring the three-dimensional propagation direction.

At each iteration in approaches described above, a vector of signal magnitudes y is obtained. As described above, one approach is a "soft voting" approach in which the squares of the signal magnitudes scale directional response functions within each iteration and the results are multiplied over the L iterations. Other approaches may be used. For example, a probabilistic approach may be used in which each iteration yields a directional probability distribution, and these distributions are combined over the iterations to yield a combined probability distribution.

In the examples described above, the beam patterns are comprehensive over a complete range of directions, for example from 0 to 180 degrees. In some embodiments, the range of directions may be limited (e.g., from 45 to 135 degrees) and the approach can nevertheless be used by using non-overlapping beam patterns that are comprehensive over the restrict range.

Finally, as introduced above and reiterated here, alternative embodiments of the approaches described above are applicable, for example, in situations in which a linear array has spacing other than one-half wavelengths or non-uniform spacing, with a one-dimensional array that is not linear (e.g., circular, triangular), with a two-dimensional array that is not rectangular, with sampled directions that are not uniform in cosine, where the patterns are not determined by permutation of directions for each iteration, and when the phase offsets are recomputed rather than transformed for each permutation of directions. However, it should be recognized that combinations of features in the embodiments described in detail above may provide performance or computational advantages, which are not necessarily achieved in some of the alternatives enumerated above.

Embodiments of the approaches may make use of hardware, software, or a combination of hardware and software. Hardware may include Application Specific Integrated Circuits (ASICs), Field Programmable Gate Arrays (FPGAs), and the like. Software may includes instructions stored on non-transitory machine-readable media (e.g., semiconductor flash memory), and these instructions, when executed by one or more processors (e.g., a special purpose or a general purpose processor) implement the procedures described above. The instructions may be at various levels, including machine-level instructions and higher-level instructions.

It is to be understood that the foregoing description is intended to illustrate and not to limit the scope of the invention. Other embodiments are within the scope of the following claims.

What is claimed is:

1. A method for determining a propagation direction of a signal within a range of directions at a transceiver coupled to a plurality of antenna elements, the method comprising:
   performing an iterative procedure in which, at each iteration of a plurality of iterations, the signal is passed via the plurality of antenna elements and processed according a set of antenna patterns for the iteration to yield a plurality of plurality of response values, each response value of the plurality of response values at an iteration representing a strength of response to the signal according to a different pattern of the set of antenna patterns for the iteration, each plurality of response values for an iteration having a greatest value corresponding to one of the patterns of the set of antenna patterns for that iteration,
   wherein each iteration uses a different set of antenna patterns,
   each set of antenna patterns includes a pattern with multiple directional lobes,
   for each set of antenna patterns, a direction of each directional lobe of each pattern is distinct from the directions of all other directional lobes of other patterns in said set, and
   for each set of antenna patterns, for each propagation direction within the range of directions, at least one antenna pattern provides substantial response to signals in said propagation direction; and
   combining the plurality of response values from each iteration to yield a characterization of the propagation direction of the signal by combining antenna patterns of the sets of antenna patterns, including combining the pattern corresponding to the response value having the greatest value from each iteration to yield a directional profile of the received signal.

2. The method of claim 1 wherein the transceiver comprises a receiver and the signal is received via the plurality of antenna elements, the propagation direction comprising a direction of arrival of the signal.

3. The method of claim 2 wherein the signal is transmitted to the receiver using an omni-directional antenna pattern at the transmitter.

4. The method of claim 2 wherein the signal is transmitted to the receiver using successive multi-lobe antenna patterns, which together form a substantially an omni-directional antenna pattern at the transmitter.

5. The method of claim 1 wherein the transceiver comprises a transmitter and the signal is transmitted via the plurality of antenna elements, the propagation direction comprising a direction of transmission of the signal.

6. The method of claim 5 wherein the response values are determined at a receiver of the signal.

7. The method of claim 1 wherein combining the plurality of response values from each iteration comprises combining only the pattern corresponding to the response value having the greatest value from each iteration.

8. The method of claim 1 wherein combining the plurality of response values from each iteration comprises combining multiple patterns from each iteration weighted according to the plurality of response values for that iteration.

9. The method of claim 1 wherein characterization of the propagation direction of the signal comprises a distribution over directions in the range of directions.

10. The method of claim 1 further comprising determining the propagation direction from the characterization of the direction of arrival.

11. The method of claim 1 further comprising determining a restricted range of directions from the characterization of the propagation direction, and determining the propagation direction within the restricted range.

12. The method of claim 1 wherein for at least some sets of the antenna patterns, each pattern in said set has a same number of directional lobes.

13. The method of claim 1 wherein the sets of antenna patterns are determined prior to the signal being transmitted.

14. The method of claim 1 further comprising determining the sets of antenna patterns.

15. The method of claim 14 wherein determining the sets of antenna patterns includes randomizing the antenna patterns.

16. The method of claim 14 wherein determining the sets of antenna patterns determining a second set of antenna patterns from a first set of antenna patterns by a random transformation.

17. The method of claim 16 wherein each pattern of the second set of antenna patterns corresponds to a different pattern of the first set of antenna patterns, and the directions of directional lobes of the pattern of the second set are related to the directions of directional lobes of the pattern of the first set by a random permutation of directions.

18. The method of claim 1 wherein a plurality of antenna elements form a linear equally spaced array.

19. The method of claim 1 wherein the antenna patterns of the sets of antenna patterns are two-dimensional.

20. The method of claim 1 wherein the antenna patterns of the sets of antenna patterns are three-dimensional.

21. The method of claim 1 wherein performing the iterative procedure includes performing iterations in sequence using different time portions of the signal.

22. An apparatus for determining a propagation direction of a signal within a range of directions at a transceiver coupled to a plurality of antenna elements, the apparatus including one or more processors and instructions stored on a machine-readable medium for causing the one or more processors to perform operations including:

performing an iterative procedure in which, at each iteration of a plurality of iterations, the signal is passed via the plurality of antenna elements and processed according a set of antenna patterns for the iteration to yield a plurality of plurality of response values, each response value of the plurality of response values at an iteration representing a strength of response to the signal according to a different pattern of the set of antenna patterns for the iteration, each plurality of response values for an iteration having a greatest value corresponding to one of the patterns of the set of antenna patterns for that iteration,
 wherein each iteration uses a different set of antenna patterns,
 each set of antenna patterns includes a pattern with multiple directional lobes,
 for each set of antenna patterns, a direction of each directional lobe of each pattern is distinct from the directions of all other directional lobes of other patterns in said set, and
 for each set of antenna patterns, for each propagation direction with the range of directions, at least one antenna pattern provides substantial response to signals in said propagation direction; and
combining the plurality of response values from each iteration to yield a characterization of the propagation direction of the signal by combining antenna patterns of the sets of antenna patterns, including combining the pattern corresponding to the response value having the greatest value from each iteration to yield a directional profile of the received signal.

23. A non-transitory machine-readable medium comprising instructions stored thereon for causing a processor of a transceiver coupled to a plurality of antenna elements to perform operations including:

performing an iterative procedure in which, at each iteration of a plurality of iterations, the signal is passed via the plurality of antenna elements and processed according a set of antenna patterns for the iteration to yield a plurality of plurality of response values, each response value of the plurality of response values at an iteration representing a strength of response to the signal according to a different pattern of the set of antenna patterns for the iteration, each plurality of response values for an iteration having a greatest value corresponding to one of the patterns of the set of antenna patterns for that iteration,
 wherein each iteration uses a different set of antenna patterns,
 each set of antenna patterns includes a pattern with multiple directional lobes,
 for each set of antenna patterns, a direction of each directional lobe of each pattern is distinct from the directions of all other directional lobes of other patterns in said set, and
 for each set of antenna patterns, for each propagation direction with the range of directions, at least one antenna pattern provides substantial response to signals in said propagation direction; and
combining the plurality of response values from each iteration to yield a characterization of the propagation direction of the signal by combining antenna patterns of the sets of antenna patterns, including combining the pattern corresponding to the response value having the greatest value from each iteration to yield a directional profile of the received signal.

24. A method for determining an antenna pattern for communicating with a remote station via a transceiver coupled to a plurality of antenna elements, the method comprising:

communicating with the remote station via the antenna array according to a plurality of different antenna patterns, each antenna pattern characterizing a directional response;

for each of the antenna patterns, determining a strength of response to the communication via the antenna array; and combining directional characteristics of the antenna patterns and respective strengths of response to determine an antenna pattern for communicating with the remote station;

wherein:

at least some of the antenna patterns having multiple directional lobes;

each direction within a range of directions has substantial directional response for multiple of the antenna patterns; and combining the directional characteristics of the antenna patterns includes forming the antenna pattern for communicating with the remote station according to characteristics of the directional lobes of multiple of the antenna patterns.

25. The method of claim 24 wherein combining the directional characteristics includes selecting a subset of the antenna patterns according to the respective strengths of response of said patterns, determining one or more directions according to directional lobes of antenna patterns of said selected subject, and forming the antenna pattern for communicating with the remote station according to the determined one or more directions such said antenna pattern has substantial response in each of said one or more directions.

* * * * *